Patented Nov. 19, 1974

3,849,393
WATER-SOLUBLE AZO DYESTUFFS CONTAINING CATIONIC GROUPS BY COUPLING DIAZONIUM NITROPHENYL COMPOUNDS WITH HOMOPHTHALIMIDES
Neville Slater Corby, James Stuart Hunter, and John Lindley Leng, Manchester, England, assignors to Imperial Chemical Industries Limited, London, England
No Drawing. Filed June 17, 1971, Ser. No. 154,201
Claims priority, application Great Britain, July 2, 1970, 32,099/70
Int. Cl. C09b 29/36; D06p 3/24, 3/76
U.S. Cl. 260—155   2 Claims

ABSTRACT OF THE DISCLOSURE

Water-soluble azo dyestuffs free from sulphonic or carboxylic acid groups and containing one or more cationic groups having the formula:

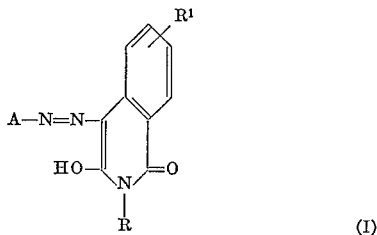

(I)

wherein A is an aromatic radical, $R^1$ is a hydrogen atom or substituent group and R is a hydrogen atom, or an optionally substituted amino, alkyl, aralkyl, alkenyl, cycloalkyl, aryl or heterocyclic radical. The dyestuffs are valuable for the coloration of polymeric materials in the form of fibers, film, threads or tapes and particularly of polymeric materials consisting of polyesters, polyamides, cellulose esters or polymers or copolymers of acrylonitrile or dicyanoethylene. These dyestuffs give yellow to orange colorations with rapid dyeing properties and are distinguished on polyacrylonitrile modified to contain acidic groups by bright yellow shades having good wet and light fastness, buildup and exhaustion.

---

This invention relates to new water-soluble azo dyestuffs which are valuable for the coloration of polymeric materials in the form of fibres, film, threads or tapes and particularly of polymeric materials consisting of polyesters, polyamides, cellulose esters or polymers or copolymers of acrylonitrile or dicyanoethylene.

According to the invention there are provided new water-soluble azo dyestuffs free from sulphonic or carboxylic acid groups and containing one or more cationic groups and having the formula:

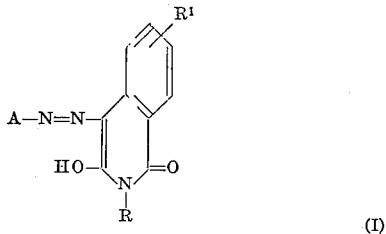

(I)

wherein A is an aromatic radical, $R^1$ is a hydrogen atom or substituent group and R is a hydrogen atom, or an optionally substituted amino, alkyl, aralkyl, alkenyl, cycloalkyl, aryl or heterocyclic radical.

The azo dyestuffs of the invention can exist in a number of tautomeric forms; for convenience the dyestuffs have only been formulated in one of these tautomeric forms, but it is to be understood that this specification includes within its scope the dyestuffs in any of the possible tautomeric forms.

The aromatic radical which is represented by A may be any aromatic carbocyclic or heterocyclic radical which may carry substituents such as alkyl, cycloalkyl, aralkyl, alkoxy, aralkoxy, aryl, carboalkoxy, acyloxy, aryloxy, naphthylazo, acylamino, aryloxy, arylamino, carbamoyl, sulphamyl, alkylsulphonyl, alkylmercapto, aralkylmercapto, dialkylamino and substituted derivatives of the foregoing, nitro, cyano, trifluoromethyl and halogeno atoms.

A is preferably a radical of the benzene, naphthalene or heterocyclic class, especially suitable substituents being Cl, Br, $CF_3$, $NO_2$, $-NH-CO-CH_3$, OH, $-NH-CO-CH_2-Cl$,
$-SO_2-NH_2$, $-SO_2-NH-CH_3$, $-SO_2-NH-C_2H_5$,
$-SO_2-N-(C_2H_5)_2$, $-SO_2-N-(CH_3)_2$, $-SO_2-NH-Ph$, $-CO-NH_2$,
$-CH-NH-C_2H_5$, $CH_3-O-$, $C_2H_5-O-$, $-SO_2-CH_3$, $-SO_2-C_2H_5$,
$-SO_2-Ph$, $-O-CH_2-CH_2-OH$, $-O-CH_2-CH_2-Cl$,
$-O-CH_2-CH_2-O-CH_3$, $-CO-O-CH_3$, $-CO-O-cyPh$,
$-NH-cyPh$, $-NH-Ph$, $-Ph$, $-O-Ph$, $-CH_2-Ph$, $-S-Ph$,
$-SO_2-NH-CH_2-$,
$CH_2-\overset{+}{P}y$, $-NH-CO-CH_2-\overset{+}{P}y$,
$-CO-NH-CH_2-CH_2-CH_2-\overset{+}{N}-(CH_3)_3$,
$-CO-O-CH_2-CH_2-\overset{+}{N}-(CH_3)_3$, $-CO-CH_3$, $-CO-C_2H_5$,
$-CO-Ph$, $-SO_2-NH-(CH_2)_3-N(CH_3)_2$, $-O-CH_2-CH_2-O-$
$CO-CH_2-CH_2-\overset{+}{P}y$, $-NH-CO-CH_2-\overset{+}{S}-(C_2H_5)_2$,
$-CO-CH_2-\overset{+}{S}-(CH_2-OH_2OH)_2$, $-O-CH_2-$
$-CH_2-\overset{+}{S}-(CH_3)-C_2H_5$, $-CO-CH_2-\overset{+}{S}-(CH_3)-C_2H_5$,
$-CO-CH_2-\overset{+}{S}-C-(NH_2)_2$, $-O-CH_2-CH_2-\overset{+}{S}=C-[N-(CH_3)_2]_2$,
$-NH-CO-CH_2-\overset{+}{S}-(CH_3)-C_2H_5$, $-NH-CH=\overset{+}{N}-(CH_3)_2$,
$O=\underset{|}{C}-NH-CH_2-\overset{+}{P}y$, $-Ph-N-CO-CH_2-\overset{+}{P}y$,
$-NH-CO-V$, $-O-CH_2-CH_2-O-CO-V$,
$-CH=N-\overset{+}{N}-(CH_3)_3$, $-NH-CO-CH-N-\overset{+}{N}-(CH_3)_3$,
$-O-CH_2-CH_2-\overset{+}{N}-(NH_2)(CH_3)_2$,
$-SO_2-NH-CH_2-CH_2-CH_2-\overset{+}{N}-(NH_2)(CH_3)_2$,
$-SO_2-CH_2-CH_2-\overset{+}{N}-(NH_2)(CH_3)_2$,
$-CO-O-CH_2-CH_2-\overset{+}{N}-(NH_2)(CH_3)_2$,
$-O-CH_2-CH_2-O-CO-CH_2\overset{+}{N}-(NH_2)(CH_3)_2$,
$-CH_2-CH_2-\overset{+}{N}-(NH_2)(CH_3)_2$,
$-NH-CO-CH_2-\overset{+}{N}-(NH_2)(CH_3)_2$, $-CH_2-\overset{+}{N}-(NH_2)(CH_3)_2$,
$-CH_2-NH-CO-CH_2\overset{+}{N}-(NH_2)(CH_3)_2$,
$-CO-CH_2-CH_2-\overset{+}{N}-(CH_3)_3$, $-SO_2-NH-\overset{+}{N}-(CH_3)_3$,
$-CO-NH-\overset{+}{N}-(CH_3)_3$, $-O-CH_2-CH_2-\overset{+}{N}-(CH_3)_3$,
$-S-CH_2-CH_2-\overset{+}{N}-(CH_3)_3$, $-O-CH_2-CH_2-\overset{+}{N}-(NH_2)(CH_3)_2$,
$-S-CH_2-CH_2-\overset{+}{N}-(NH_2)(CH_3)_2$, $-CO-CH_2-\overset{+}{N}-(CH_3)_3$,
$-NH-CO-CH_2-\overset{+}{N}-(CH_3)_3$, $-CO-CH_2-\overset{+}{P}-(CH_3)_2Ph$,
$-CH_2-\overset{+}{P}-(C_4H_9)_3$, $-CO-CH_2-\overset{+}{P}-(C_4H_9)_3$,
$-O-CH_2-CH_2-\overset{+}{P}-(C_4H_9)_3$, $-SO_2-CH_2-CH_2-\overset{+}{P}-(C_4H_9)_3$,
$-CO-O-CH_2-\overset{+}{P}-(C_4H_9)_3$, $-CH_2\overset{+}{P}y$, $-CH_2-CH_2-\overset{+}{N}(CH_3)_3$,
$-O-CH_2-CH_2-\overset{+}{P}y$, $-CO-CH_2-\overset{+}{W}$, $-NH-CO-CH_2-\overset{+}{W}$,
$-CO-CH_2-\overset{+}{D}$, $-NH-CO-CH_2-\overset{+}{D}$, $-CH_2-\overset{+}{D}$, $-CH_2-\overset{+}{D}$,
$-O-CH_2-CH_2-OCH_2-CH_2-G^+$, $-SO_2-NH-CH_2-CH_2-V^+$,
$-SO_2-NH-CH_2-CH_2-G^+$, $-SO_2-NH-CH_2-CH_2-W^+$,
$-CO-CH_2-M^+$, $-NH-CO-CH_2-M^+$,
$-SO_2-NH-CH_2-CH_2-M^+$, $-CH_2-M^+$, phenylazo, 3 - trimethylammoniumphenylazo, 4 - pyridiniumacetylphenylazo, 4 - pyridiniumacetylaminophenylazo, 3 - trimethylammoniumphenylcarbamoyl, 3-trimethylammoniumphenylsulphamyl, and imidazolinylthioethoxy.

Particularly valuable dyestuffs, especially in regard to wet and light fastness, are obtained when A is an optionally substituted aromatic radical, especially a phenyl radical but which may be another aromatic carbocylic radical or aromatic heterocyclic radical, having a nitro group in the ortho position to the azo linkage.

The radical may contain a cationic group as for example in

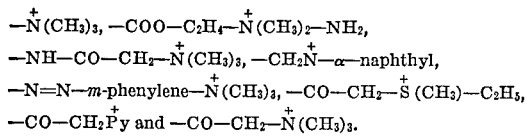

In the foregoing radicals the symbol Ph stands for the phenyl radical, $\overset{+}{Py}$ for the pyridinium radical, CyPh for the cyclohexyl radical, $\overset{+}{M}$ for the quinolium radical.

$\overset{+}{V}$ stands for the 1-methyl-3-pyridinium radical.

$\overset{+}{W}$ stands for 4-N,N-dimethylaminopyridinium radical.

$\overset{+}{D}$ stands for the 2-methylpyridinium radical.

$\overset{+}{G}$ stands for the 4-methylpyridinium radical.

As examples of groups which may be represented by R there are mentioned alkyl groups such as methyl, ethyl, propyl, substituted alkyl groups such as β-hydroxyethyl,
β-ethoxyethyl,
β-aminoethyl,
γ-dimethylaminopropyl,
β-pyridinium ethyl,
β-(α-methylpyridinium)ethyl,
acetylaminoethyl,
γ-methoxypropyl,
β-(1'-methylpyridinium-3'-carbonylamino)ethyl,
β-(1'-methylpyridinium-2'-amino)ethyl, and
β-(1'-methylpyridinium-4'-amino)ethyl, amino groups and substituted amino groups such as —N(CH₃)₂, —NH—Ph, and 1'-methylpyridinium-3'-carbonylamino, aralkyl groups such as benzyl and p-methoxybenzyl, cycloalkyl groups such as cyclohexyl, 2-methylcyclohexyl and 2-methylpentyl, aryl groups such as phenyl,
4-methoxyphenyl,
2-, 3- and 4-methylphenyl,
4-aminophenyl,
4-nitrophenyl,
3-nitrophenyl,
2-, 3- and 4-chlorophenyl,
4-bromophenyl,
4-acetylaminophenyl,
4-w-pyridiniumacetylaminophenyl,
4-[β-pyridiniumethylaminosulphonyl]phenyl,
4-[β-pyridiniumethylaminosulphonyl]-2-chlorophenyl,
4-[β-pyridumethyloxycarbonyl]phenyl,
3-[β-pyridiniumethylaminosulphonyl]phenyl,
3-trimethylammoniumphenyl,
2-chloro-5-trimethylammoniumphenyl,
3-[2'-methylpyridiniumethyl]-4-methylphenyl,
3-pyridiniumethyl-4-methylphenyl,
3-pyridiniummethyl-4-methoxyphenyl,
4-w-trimethylammoniumacetylphenyl,
3-quinoliniummethyl-4-methoxyphenyl,
3-(2'-methylpyridiniummethyl)-4,6-dimethylphenyl,
3-N,N,N-tetramethylisothiuroniummethyl-4-methylphenyl,
1-naphthyl,
3-(1'-methylpyridinium-4'-carbonylamino)phenyl,
4-(1'-methylpyridinium-3'-carbonylamino)phenyl, and
4-(1'-methylpyridinium-4'-amino)phenol, and heterocyclic groups such as 1, 3, 5-triazol-2-yl and thiazol-2-yl.

As examples of groups which may be represented by R¹ there are mentioned alkyl groups such as methyl and ethyl, substituted alkyl groups such as chloromethyl and pyridinium methyl, hydroxy, alkoxy such as methoxy, and nitro, amino and substituted amino such as alkylamino, acetamido, and pyridiniumacetamido.

As examples of cationic groups there are mentioned quaternary ammonium, cyclammonium, hydrazinium, sulphonium, isothiouronium groups, etherified hydroxylammonium, and phosphonium groups which will be associated with an anion.

As quaternary ammonium groups there are meant groups of the formula

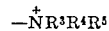

wherein R³, R⁴ and R⁵ each represent a hydrogen atom or, preferably, an alkyl or cycloalkyl group or substituted derivative thereof. As alkyl or substituted alkyl groups which may be represented by R³, R⁴ and R⁵ there may be mentioned for example particularly methyl, but also ethyl, β-hydroxyethyl and benzyl.

As cyclammonium groups there are meant heterocyclic systems containing in the ring a quaternised nitrogen atom through which the ring is preferably but not necessarily attached to the remainder of the molecule. As examples of such groups there are mentioned N-alkyl such as N-methylpiperidinium and N-methylmorpholinium, and, particularly, aromatic heterocyclic systems such as pyridinium, quinolinium and isoquinolinium.

The heterocyclic groups may if desired be attached through a carbon atom of the heterocyclic ring as for example an N-methylpyridinium group attached through the 4-position. These heterocyclic systems may be optionally substituted by for example alkyl groups and may contain hetero-atoms additional to the quaternised nitrogen atom.

As sulphonium groups there are meant groups of the formula

wherein R⁶ stands for an alkyl or substituted alkyl radical such as methyl or ethyl, R⁷ stands for an alkyl or substituted alkyl radical such as methyl, ethyl and β-hydroxyethyl, a cycloalkyl radical such as cyclohexyl, an aralkyl radical such as benzyl or an aryl radical such as phenyl and p-tolyl.

As isothiouronium groups there are meant groups which in one of their resonating forms may be represented by the formula

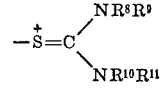

wherein R⁸, R⁹, R¹⁰ and R¹¹ represent hydrogen atoms or hydrocarbon or substituted hydrocarbon radicals or R⁸ and R¹⁰ may together form an alkylene radical.

As examples of hydrocarbon and substituted hydrocarbon radicals which may be represented by R⁸, R⁹, R¹⁰ and R¹¹ there may be mentioned alkyl radicals such as methyl and ethyl, substituted alkyl radicals such as β-hydroxyethyl, cycloalkyl radicals such as cyclohexyl, aralkyl radicals such as benzyl and aryl radicals such as phenyl and p-tolyl. As an example of an alkylene radical which may be formed by R⁸ and R¹⁰ together there may be mentioned ethylene. In this case an imidazoline ring is formed.

As hydrazinium groups there are meant groups of the formula

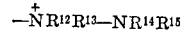

wherein R¹² represents an optionally substituted alkyl, cycloalkyl, aralkyl, cycloalkyl, aralkyl or phenyl radical or together with R¹³ and the adjacent nitrogen atom a heterocyclic system.

R¹³ represents an optionally substituted alkyl, cycloalkyl, aralkyl or phenyl radical or together with R¹² and the adjacent nitrogen atom a heterocyclic system.

R¹⁴ represents a hydrogen atom or an optionally substituted alkyl radical or an acyl radical which may form a ring with R¹⁵ and N or when R¹² and R¹³ are other than a phenyl radical.

R¹⁵ represents a hydrogen atom or an optionally substituted alkyl radical or an acyl radical.

As phosphonium groups there are meant groups of the formula

wherein R¹⁶, R¹⁷ and R¹⁸ are organic radicals, which may be the same or different, each having a carbon atom linked directly to the phosphorus atom. As examples of organic radicals which be represented by R¹⁶, R¹⁷ and R¹⁸ there may be mentioned aliphatic radicals for example methyl, ethyl, propyl, butyl, allyl, chloromethyl, hydroxymethyl and β-hydroxyethyl, aromatic radicals for example phenyl, naphthyl, p-tolyl, p-chlorophenyl, aralkyl radicals for example benzyl and heterocyclic radicals for example 2-thienyl.

The cationic group or groups may be contained in a radical A or a group R or R¹ or may be attached directly to the benzene ring fused with the hydroxy-pyridone ring. The cationic group may for example be attached directly or through a group such as —X¹—(A¹)ₙ— to an aromatic nucleus wherein n=0 or 1, X¹ is a linking group such as —CO—, —NH—, —SO₂—, —CO—O—, —O—, —NH—CH=, —CO—NH—CH₂—, —CH=N—,

—NH—CO—CH₂—,

—C₂H₄—, —CH₂, —CH₂—, —CH₂—NH—CO—, —S— and A¹ is an alkylene or substituted alkylene group.

As anions associated with the cationic group there may be mentioned for example inorganic anions such as chloride, bromide, iodide, tetrachlorozincate, bisulphate, acetate or sulphate, sulphamate, phosphate, borate, or organic anions such as methosulphate, methylsulphate, and p-tolylsulphonate. In those cases where the anion is polyvalent the water-soluble dyestuffs will contain a corresponding molar proportion of the cationic part of the dyestuff.

According to a further feature of the invention there is provided a process for the manufacture of the azo dyestuffs of the invention which comprises diazotising an amine of the formula A—NH₂ and coupling the resulting diazo compound with a coupling component of the formula:

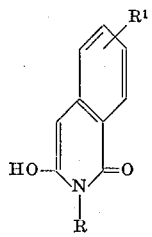

wherein A, R, and R¹ have the meanings stated hereinbefore, either the amine and/or the coupling component carrying as substituent at least one cationic group as hereinbefore defined.

The diazotisation and coupling stages of this process can be carried out in conventional manner for example by mixing a solution of the diazotised amine, obtained in a known manner, with an aqueous solution of the coupling component which has been dissolved in water by the addition of sodium carbonate, sodium bicarbonate, sodium hydroxide or preferably sodium acetate.

Amines of the formula A—NH₂ which do not contain a cationic group and may be used in the process of the invention include aniline, o-, m- or p-toluidine,
o,- m- or p-anisidine,
o-, m- or p-chloroaniline,
o-, m-, or p-bromoaniline,
o-, m- or p-nitroaniline,
2,5-dichloroaniline,
2,4-dinitroaniline,
2,4-dinitro-6-(chloro or bromo)-aniline,
4-methanesulphonylaniline,
4-aminobenzotrifluoride,
4- or 5-nitro-2-toluidine,
4- or 5-nitro-2-anisidine,
4- or 5-chloro-2-anisidine,
4- or 5-chloro-2-toluidine,
4- or 5-bromo-2-anisidine,
2,6-di chloro-or bromo-)-4-nitroaniline,
2,4,6-trinitroaniline,
2,4-dinitro-6-carbomethoxyaniline,
2-amino-5-nitrobenzotrifluoride,
2,4-bis(methanesulphonyl)aniline,
2-(chloro- or bromo-)-4-nitroaniline,
methylanthranilate,
4- or 5-nitromethylanthranilate,
4-aminobenzamide,
2,6-di(chloro- or bromo-)aniline-4-sulphonamide,
2,6-di(chloro- or bromo-)-4-methylsulphonylaniline,
2,5-di-(chloro- or bromo-)-4,6-dinitroaniline,
2-amino-3,5-di-nitrobenzotrifluoride,
3-amino-2-(chloro- or bromo-)-4,6-dinitro-(toluene or anisole),
3-amino-4-(chloro-or bromo-)-2,6-dinitro(toluene or anisole),
2- or 4-cyanoaniline, 4-nitro-2-cyanoaniline,
2,4-dinitro-6-cyanoaniline,
2-nitro-4-cyanoaniline,
2-chloro-4-cyanoaniline,
3-amino-2,4,6-trinitrotoluene,
2-(chloro- or bromo-)-4-methylsulphonylaniline,
3-(chloro- or bromo-)-4-thiocyanatoaniline,
2-(chloro- or bromo-)-4-sulphamylaniline,
2-amino-5-nitrophenylmethanesulphone,
2-amino-3,5-dinitrophenylmethylsulphone,
2-amino-3-(chloro- or bromo-)-5-nitrophenylmethylsulphone,
2-sulphamyl-4-nitroaniline,
2-methylsulphamyl-4-nitroaniline,
2-ethylsulphamyl-4-nitroaniline,
2-butylsulphamyl-4-nitroaniline,
2-dimethylsulphamyl-4-nitroaniline,
2-methylsulphamyl-4,6-dinitroaniline,
2-methylsulphamyl-4-nitro-6-(chloro- or bromo-)aniline,
2-phenylsulphamyl-4-nitroaniline,
methyl 2-amino-3-(chloro- or bromo)-5-nitrobenzoate,
dimethyl 2-aminoterephthalate,
dimethyl 2-amino-5-nitroterephthalate,
aniline -2-, 3- or 4-sulphamate,
2-aminobenzamide,
aniline-2-, 3- or 4-N,N-dimethylsulphamate,
4-aminobenzenesulphonamide,
2-nitro-4-methylaniline,
2-nitro-4-chloroaniline,
2-cyano-4-methylaniline,
4-chloro-2-methylaniline,
1-methyl-3-nitro-2-aminoiminazole,
2-aminothiazole,
2-amino-6-methoxybenzthiazole,
2-amino-6-methylsulphonyl benzthiazole,
2-amino-6-nitrobenzthiazole,
2-aminobenzthiazole,
2,5-dimethoxyaniline,
2-amino-5-nitrothiazole,
2-amino-4-methyl-5-nitrothiazole, 2-amino-4- m-nitrophenyl-5-nitrothiazole,
3-metyhl-4-nitro-5-aminoisothiazole,
3-methoxy-5-amino-1,2,4-thidiazole,
3-methylsulphonyl-5-amino-1,2,4-thiadiazole,
3-methylmercapto-5-amino-1,2,4-thiadiazole,
3-phenyl-5-amino-1,2,4-thiadiazole,2-amino-1,3,4-thiadiazole,
3-phenyl-5-amino-1,2,4-thiadiazole,
2-amino-1,3,4-thiadiazole,
2-amino-5-nitro-1,3,4-thiadiazole,
4-aminobenzene(2,5- or 3,5-dichloro)benzenesulphon-N,N-dimethylamide,
4-amino-3-chlorobenzenesulphon-N,N-dimethylamide,
5-chloro-2,4-bis-(N,N-dimethylaminosulphonyl)aniline,
2-chloro-5-cyanoaniline,
2-cyano-5-chloroaniline,
2,4-dicyanoaniline,
4-aminodiphenylamine,
4-aminodiphenylmethane,
4-aminodiphenylsulphone,
4-aminoazobenzene,
4-phenylazo-1-aminonaphthalene,2-aminobenzenesulphon-N,N-dimethylamide,
2-trifluoromethylaniline,
2- or 4-aminobenzonitrile,
2-aminophenylmethyl or ethylsulphone and
4-chloro-2-trifluoromethylaniline.

Amines of the formula A—NH$_2$ which contain a cationic group and may be used in the process of the invention include (4-amino-phenylsulphonylamino)ethylpyridinium chloride,
(4-amino-3-chlorophenylsulphonylamino)ethylpyridinium chloride,
(4-amino-2,5-dichlorophenylsulphonylamino) ethylpyridinium chloride,
4-amino-3,5-dichlorophenylsulphonylamino) ethylpyridinium chloride,
4-aminophenacyltrimethylammonium chloride,
(3-amino-4-methylphenacyl)-trimethylammonium chloride,
(4-amino-2-chlorophenacyl)-trimethylammonium chloride
(4-amino-2,5-dimethylphenacyl)ammonium chloride,
(3-amino-4-methoxyphenacyl)-trimethylammonium chloride,
(4-aminophenylaminocarbonyl)methylpyridinium chloride,
(4-aminophenylsulphonylaminoethyl)trimethyl-ammonium chloride,
N$^1$-4-aminophenylcarbonylmethyl-N,N-dimethylhydrazinium chloride,
4-aminophenyloxyethylcarbonyloxy-ethylpyridinium chloride,
m-aminophenyl-trimethylammonium chloride,
3-(4'-aminobenzoylamino)phenyltrimethylammonium chloride,
3-(4'-aminophenylsulphonylamino)phenyl-trimethylammonium chloride,
4-amino-phenylcarbonyloxyethyl-trimethyl-ammonium chloride,
4-amino-phenyl-methyl-trimethylammonium chloride,
3-aminophenyl-methyltrimethylammonium chloride,
3-aminophenyl-methylpyridinium chloride,
(3-aminophenylsulphonylamino)ethylpyridinium chloride,
3-aminophenacyl-trimethylammonium chloride,
3-aminophenyl-methylpyridinium chloride,
3-aminophenylaminocarbonyl-methyl-pyridinium chloride,
3-aminophenylsulphonylaminoethyl-trimethylammonium chloride,
N'-3-aminophenylsulphonylaminoethyl-N,N-dimethylhydrazinium chloride, N'-3-aminophenacyl-N,N-di-methylhydrazinium chloride,
3-aminophenyl-methyl-trimethylammonium chloride,
N'-3-aminophenylmethyl-N,N-dimethylhydrazinium chloride,
3-aminophenylaminocarbonylmethyl trimethylammonium chloride,
N'-3-aminophenylaminocarbonylmethyl-N,N-dimethyl-hydrazinium chloride,
(4-aminophenylsulphonylamino)-ethyl-2-methylpyridinium chloride,
4-aminophenylaminocarbonylmethyl-diethylsulphonium chloride,
4-aminophenyloxyethyl methyl-ethylsulphonium chloride,
4-aminophenylthioethyl-trimethylammonium chloride,
4-aminophenacyl-isothiouronium chloride,
3-($\beta$-4-aminophenoxyethylcarbonyl)-1-methylpyridinium chloride,
N'-4-aminophenylcarbonylmethylidine-N,N,N-trimethylhydrazinium chloride,
4-amino-3-nitrophenyltrimethylammonium chloride,
3-amino-4-nitrophenyltrimethylammonium chloride,
$\beta$-(4-amino-3-nitrophenylsulphonylamino) ethylpyridinium chloride, and
1,2-dimethyl-4-amino-6-chlorobenzimidazolium chloride.

As examples of coupling components there are mentioned
2-ethylisoquinoline-1,3-diol,
isoquinoline-1,3-diol,
2-$\gamma$-dimethylaminopropylisoquinoline-1,3-diol hydrochloride,
2-$\beta$-pyridiniumethylisoquinoline-1,3-diol chloride,
2-$\beta$-2'-methylpyridiniumethylisoquinoline-1,3-diol chloride,
2-$\beta$-hydroxyethylisoquinoline-1,3-diol,
2-$\beta$-acetylaminoethylisoquinoline-1,3-diol,
2-phenyl isoquinoline-1,3-diol,
2-4'-methylphenylisoquinoline-1,3-diol,
2-[4'-($\beta$-pyridiniumethylaminosulphonyl)phenyl] isoquinoline-1,3-diol chloride,
2-aminoisoquinoline-1,3-diol,
2-phenylaminoisoquinoline-1,3-diol,
2-3'-chlorophenylisoquinoline-1,3-diol,
2,3'-trimethylammoniumphenylisoquinoline-1,3-diol chloride, and
2-[3'-trimethylammonium-6'-chlorophenyl]isoquinoline-1,3-diol chloride.

There is also provided an alternative process for the manufacture of the azo dyestuffs of the invention which comprises reacting a compound having the formula I wherein A, R and R$^1$ have the meanings given hereinbefore and containing an anion forming group with a compound capable of alkylation to give a cationic group.

As examples of anion forming groups represented by Q there are mentioned especially chlorine, bromine and iodine atoms, and sulphato groups. In the reaction this group is converted into the anion.

As examples of compounds capable of alkylation to give a cationic group there are mentioned tertiary amines, hydrazines, thioureas, isothioureas, and phosphines such as trimethylamine, triethanolamine, pyridine, tetramethyl-thiourea, thiodiglycol, phenyl dimethyl phosphine, tri-n-butylphosphine, thiourea, ethylene thiourea, triphenyl-phosphine, picoline and dimethylaminopyridine.

The alternative process of the invention may conveniently be carried out by heating the compound containing an anion-forming group with a compound capable of alkylation either alone, or, preferably, in a solvent such as acetone, methanol, dioxan or water, dimethylformamide or acetic acid.

A particular example of this alternative process of the invention may conveniently be carried out by chloromethylating an azo dye derived from a water-insoluble amine and a homophthalimide, and reacting the resulting azo dyestuff (containing one or more CH$_2$Cl substituents) with a quaternisable compound.

Such a chloromethylation may be conveniently carried out by reacting a water-soluble azo dyestuff of the type herein disclosed with formaldehyde/chlorosulphonic acid at 0°–50° C. in concentrated sulphuric acid for a period of 1–48 hours, or by reacting the dye in sulphuric acid with formaldehyde/sodium chloride. Other chloromethylation techniques may also be used.

Another alternative method of obtaining dyestuffs of the invention is by alkylation of a dyestuff of formula I wherein A, R and $R^1$ have the meanings given hereinbefore and containing a group or atom capable of alkylation to give a cationic group.

Alkylating agents which may be used include halides such as methyl iodide, ethylbromide, cyclohexyl chloride and benzyl bromide, sulphates such as dimethyl, diethyl, dicyclohexyl and benzylmethyl sulphate and arylsulphonic acid esters such as methyl and benzyl p-toluene sulphonates.

Groups or atoms which are capable of alkylation may be for example primary, secondary or tertiary amino or alkylmercapto groups.

The process of this alternative method of the invention may conveniently be carried out by heating a mixture of the azo compound in a suitable solvent such as benzene, chloroform, dioxan, toluene, nitrobenzene, chlorobenzene, acetone, water, acetic acid or N,N-di-methylformamide with the alkylating agent and preferably also with an acid binding agent such as magnesium oxide, calcium or sodium bicarbonate and stirring the mixture for example for a period of from 1 to 24 hours at a suitable temperature (for example between 20 and 130° C. and especially between 75 and 130° C.), if necessary in a closed vessel under pressure. The product being insoluble in inert organic solvents such as dioxan or chlorobenzene may conveniently be isolated by filtration and washing, or where the product is soluble in the solvent used, by dilution with water and subsequent salting-out.

The dyestuffs of the invention are valuable for their rapid dyeing properties and give yellow or orange colorations in polymeric materials particularly in the form of textile materials especially those containing polymers and copolymers of acrylonitrile and of dicyanoethylene and polyesters, polyamides and cellulose esters. The polymeric materials may be modified, for example acid-modified.

The dyestuffs of the invention may be applied to polyamide, cellulose ester, or particularly polyacrylonitrile or polydicyanoethylene materials from acid, neutral or slightly alkaline dyebaths (i.e. pH from 3 to 8) at temperatures between 40 and 120° C. and preferably between 80 and 120° C. or by printing techniques using thickened print pastes.

On polyacrylonitrile textile materials, especially when the polyacrylonitrile has been modified to contain acidic groups, bright yellow shades are obtained which are distinguished by their good wet and light fastness, build up and exhaustion properties.

The dyestuffs are particularly valuable for coloration, preferably from neutral dyebaths, of polyamide and polyester polymeric materials which are modified to contain acidic groups.

The invention is illustrated but not limited by the following examples in which all parts and percentages are by weight unless otherwise specified.

EXAMPLE 1

3.28 parts of β-(4-aminophenylsulphonylamino)ethyl pyridinium chloride is dissolved in a mixture of 50 parts of water and 2.5 parts of 10N hydrochloric acid, and diazotised at 0–5° C. with the addition of 2N aqueous sodium nitrite.

After removal of excess nitrous acid from the diazo compound with the addition of a small amount of 20% aqueous sulphamic acid, the diazo mixture is added at 5–10° C. to a solution of 1.98 parts of 2-ethyl isoquinoline-1,3-diol in 75 parts of water containing 5 parts of 2N aqueous sodium hydroxide and 4.5 parts of sodium acetate. The dyestuff is filtered off, washed successively with 10% brine and 2½% brine and vacuum-dried at 40–50° C.

When applied to polyacrylonitrile from neutral or weakly acidic dyebaths, an attractive greenish-yellow shade is produced.

1 part of the dyestuff prepared above is pasted with 1 part of 30% aqueous acetic acid and diluted with 200 parts of hot water. The solution is then raised to the boil and allowed to cool. 10 parts of the above dyestuff solution are added to a dyebath containing 0.03 parts of acetic acid, 0.1 part of sodium acetate and 300 parts of water. The temperature of the dyebath is raised to 70° and 5 parts of polyacrylonitrile fabric are added. The temperature of the dyebath is then raised to 90° over 15 minutes, held at 90° for 15 minutes, raised from 90° to 100° over 10 minutes and held at the boil for 1½ hours. The dyed fabric is removed, rinsed with cold water and dried.

EXAMPLE 2

By replacing the ethylisoquinoline-1,3-diol in Example 1 by 1.68 parts of isoquinoline-1,3-diol, a dyestuff yielding a similar shade on polyacrylonitrile is obtained.

EXAMPLE 3

1.38 parts of o-nitroaniline are suspended in 20 parts of water containing 3 parts of 35% hydrochloric acid, and the mixture stirred at 0–5° C. for 18 hours. A solution of 0.7 parts of sodium nitrite in 5 parts of water is then added. After removal of excess nitrite with a little 20% aqueous sulphamic acid, the diazo mixture is added to a solution of 3.1 parts of 2-γ-dimethylaminopropylisoquinoline-1,3-diol hydrochloride and 3 parts of sodium acetate in 50 parts of water at 0–5° C. The mixture is stirred for 1 hour at 0–5° C., and the precipitated dyestuff filtered off, washed with a little cold water and dried.

When applied to polyacrylonitrile fibres from neutral or weakly acidic dyebaths it yields attractive mid-yellow shades with good fastness properties.

The 2-γ-dimethylaminopropylisoquinoline-1,3-diol hydrochloride used above is prepared by heating a mixture of 18 parts of homophthalic acid and 20.4 parts of γ-dimethylaminopropylamine at 160° for 4 hours. Excess amine and water are distilled off under a vacuum, and the residue diluted with 80 parts of acetone. A current of dry hydrogen chloride gas is then passed into the acetone solution at room temperature for 15–20 minutes. The precipitated product, a colourless crystalline solid, is collected, washed with acetone and vacuum dried at room temperature.

Further examples of the invention are illustrated in the following table:

| | | Coupling component | | |
|---|---|---|---|---|
| Example | Diazo component | R | $R_1$ | Shade |
| 4 | 2-chloro-4-nitroaniline | $-C_3H_6-\overset{+}{N}H(CH_3)_2Cl^-$ | H | Greenish-yellow. |
| 5 | p-Nitroaniline | $-C_3H_6-\overset{+}{N}H(CH_3)_2Cl^-$ | H | Do. |
| 6 | 2-nitro-4-chloroaniline | $-C_3H_6-\overset{+}{N}H(CH_3)_2Cl^-$ | H | Yellow. |
| 7 | p-Toluidine | $-C_3H_6-\overset{+}{N}H(CH_3)_2Cl^-$ | H | Do. |
| 8 | 2-nitro-4-methoxyaniline | $-C_3H_6-\overset{+}{N}H(CH_3)_2Cl^-$ | H | Orange. |

TABLE—Continued

| Example | Diazo component | Coupling component R | R₁ | Shade |
|---|---|---|---|---|
| 9 | 2-ethylsulphonyl-4-methoxyaniline | —$C_3H_6$—$\overset{+}{N}H(CH_3)_2Cl^-$ | H | Yellow. |
| 10 | 4-(3'-trimethylammoniumphenylazo)-3-methylaniline. | Ethyl | H | Reddish-yellow. |
| 11 | 2-nitro-4-methylaniline | —$C_3H_6$—$\overset{+}{N}H(CH_3)_2Cl^-$ | H | Yellow. |
| 12 | 2-nitro-6-methylaniline | —$C_3H_6$—$\overset{+}{N}H(CH_3)_2Cl^-$ | H | Do. |
| 13 | 2-nitro-5-trifluoromethylaniline | —$C_3H_6$—$\overset{+}{N}H(CH_3)_2Cl^-$ | H | Do. |
| 14 | 2-nitro-4-sulphon-N-ethylamidoaniline | —$C_3H_6$—$\overset{+}{N}H(CH_3)_2Cl^-$ | H | Do. |
| 15 | 2-nitro-6-chloroaniline | —$C_3H_6$—$\overset{+}{N}H(CH_3)_2Cl^-$ | H | Do. |
| 16 | 2-nitro-4-acetylaniline | —$C_3H_6$—$\overset{+}{N}H(CH_3)_2Cl^-$ | H | Do. |
| 17 | 2-nitro-5-chloroaniline | —$C_3H_6$—$\overset{+}{N}H(CH_3)_2Cl^-$ | H | Do. |
| 18 | 2-nitro-4-bromoaniline | —$C_3H_6$—$\overset{+}{N}H(CH_3)_2Cl^-$ | H | Do. |
| 19 | 2-nitro-4-dodecylaniline | —$C_3H_6$—$\overset{+}{N}H(CH_3)_2Cl^-$ | H | Do. |
| 20 | 2-nitro-4-trifluoromethylaniline | —$C_3H_6$—$\overset{+}{N}H(CH_3)_2Cl^-$ | H | Do. |
| 21 | 2-nitro-5-bromoaniline | —$C_3H_6$—$\overset{+}{N}H(CH_3)_2Cl^-$ | H | Do. |
| 22 | 2-nitro-4,5-dichloroaniline | —$C_3H_6$—$\overset{+}{N}H(CH_3)_2Cl^-$ | H | Do. |
| 23 | 2-nitro-4-butylaniline | —$C_3H_6$—$\overset{+}{N}H(CH_3)_2Cl^-$ | H | Do. |
| 24 | 2-carbomethoxy-5-chloroaniline | —$C_3H_6$—$\overset{+}{N}H(CH_3)_2Cl^-$ | H | Greenish-yellow. |
| 25 | 2-carbomethoxyaniline | —$C_3H_6$—$\overset{+}{N}H(CH_3)_2Cl^-$ | H | Do. |
| 26 | 2-cyano-5-methylaniline | —$C_3H_6$—$\overset{+}{N}H(CH_3)_2Cl^-$ | H | Do. |
| 27 | 2-cyanoaniline | —$C_3H_6$—$\overset{+}{N}H(CH_3)_2Cl^-$ | H | Do. |
| 28 | 2,4-dinitroaniline | —$C_3H_6$—$\overset{+}{N}H(CH_3)_2Cl^-$ | H | Yellow. |
| 30 | 2,4-dinitro-6-bromoaniline | —$C_3H_6$—$\overset{+}{N}H(CH_3)_2Cl^-$ | H | Do. |
| 31 | 2,4-dinitro-6-carboxymethylaniline | —$C_3H_6$—$\overset{+}{N}H(CH_3)_2Cl^-$ | H | Do. |
| 32 | 2,5-dichloro-4,6-dinitroaniline | —$C_3H_6$—$\overset{+}{N}H(CH_3)_2Cl^-$ | H | Do. |
| 33 | 2,5-dibromo-4,6-dinitroaniline | —$C_3H_6$—$\overset{+}{N}H(CH_3)_2Cl^-$ | H | Do. |
| 34 | 2,4-dinitro-6-chloro-3-methylaniline | —$C_3H_6$—$\overset{+}{N}H(CH_3)_2Cl^-$ | H | Do. |
| 35 | 2,4-dinitro-6-bromo-3-methoxyaniline | —$C_3H_6$—$\overset{+}{N}H(CH_3)_2Cl^-$ | H | Do. |
| 36 | 2,4-dinitro-6-cyanoaniline | —$C_3H_6$—$\overset{+}{N}H(CH_3)_2Cl^-$ | H | Do. |
| 37 | 2-nitro-4-cyanoaniline | —$C_3H_6$—$\overset{+}{N}H(CH_3)_2Cl^-$ | H | Do. |
| 38 | 3-amino-2,4,6-trinitrotoluene | —$C_3H_6$—$\overset{+}{N}H(CH_3)_2Cl^-$ | H | Do. |
| 39 | 2-amino-3,5-dinitrophenylmethylsulphone | —$C_3H_6$—$\overset{+}{N}H(CH_3)_2Cl^-$ | H | Do. |
| 40 | 4-amino-3-nitrophenyl-trimethylammonium chloride. | H | H | Do. |
| 41 | do | Ethyl | H | Do. |
| 42 | do | β-Hydroxyethyl | H | Do. |
| 43 | do | Phenyl | H | Do. |
| 44 | do | 2-chlorophenyl | H | Do. |
| 45 | β-(4-amino-3-nitrophenylsulphonylamino)ethyl-pyridinium chloride. | Methyl | H | Do. |
| 46 | do | H | H | Do. |
| 47 | do | Phenyl | H | Do. |
| 48 | β-(4-amino-3-nitrophenylsulphonylamino)ethyl-pyridinium chloride. | p-Tolyl | H | Do. |
| 49 | 1-(4-aminophenacyl)-2-methylpyridinium chloride | H | H | Greenish-yellow. |
| 50 | 1-(4-aminophenacyl)-quinolinium chloride | H | H | Do. |
| 51 | 1-[β-(4-aminophenysulphonylamino)ethyl]-4-methylpyridinium chloride. | H | H | Do. |
| 52 | β-(4-aminophenylsulphonyl-amino)ethyltrimethyl-ammonium chloride. | H | H | Do. |
| 53 | 3-aminophenyltrimethylphosphonium chloride | H | H | Do. |
| 54 | 4-aminophenoxyethyldimethylmethoxyammonium p-toluenesulphonate. | H | H | Do. |
| 55 | N-β-(4-amino-3-chlorophenylsulphonylamino)-ethyl-N,N-dimethylhydrazinium chloride. | H | H | Do. |
| 56 | N-3-aminophenylsulphonylaminoethyl-N,N-hydrazinium chloride. | H | H | Do. |
| 57 | (4-aminophenoxyethyl)-ethylmethylsulphonium chloride. | H | H | Do. |
| 58 | 4-aminophenacylisothiouronium chloride | H | H | Do. |
| 59 | (4-aminophenylcarbamoylmethyl)-diethylsulphonium chloride. | H | H | Do. |
| 60 | 1-[β-(4-amino-3-nitrophenylsulphonylamino)ethyl]-4-N,N-dimethylaminopyridinium chloride. | Ethyl | H | Yellow. |
| 61 | 4-amino-3-nitrophenyltrimethylammonium chloride | do | 7-nitro | Do. |
| 62 | do | do | 7-methoxy | Do. |
| 63 | o-Nitroaniline | —$C_3H_6$—$\overset{+}{N}H(CH_3)_2Cl^-$ | 7-hydroxy | Do. |
| 64 | 2-nitro-4-methylaniline | —$C_3H_6$—$\overset{+}{N}H(CH_3)_2Cl^-$ | do | Do. |
| 65 | 2-nitro-4-chloroaniline | —$C_3H_6$—$\overset{+}{N}H(CH_3)_2Cl^-$ | do | Do. |
| 66 | o-Nitroaniline | —$C_3H_6$—$\overset{+}{N}H(CH_3)_2Cl^-$ | 7-nitro | Do. |
| 67 | 2-nitro-4-methylaniline | —$C_3H_6$—$\overset{+}{N}H(CH_3)_2Cl^-$ | do | Do. |
| 68 | 4-amino-3-nitrophenyltrimethylammonium chloride | H | 7-amino | Do. |
| 69 | do | Ethyl | 7-hydroxy | Do. |
| 70 | o-Nitroaniline | β-Pyridiniumethyl | H | Do. |

TABLE—Continued

| Example | Diazo component | Coupling component R | R₁ | Shade |
|---|---|---|---|---|
| 71 | 2-nitro-4-methylaniline | do | H | Yellow. |
| 72 | o-Nitroaniline | β-Hydroxy-β-pyridiniumethyl | H | Do. |
| 73 | do | β-4-methylpyridiniumethyl | H | Do. |
| 74 | 2-nitro-4-chloroaniline | do | H | Do. |
| 75 | 4-amino-3-nitrophenyltrimethylammonium chloride | Ethyl | 7-acetamido | Do. |
| 76 | o-Nitroaniline | do | 7-pyridiniumacetamido | Do. |

EXAMPLE 77

3 parts of the dyestuff prepared as described in Example 3 are dissolved at 60° in 300 parts of water, and 2 parts of sodium bicarbonate added, precipitating the free base of the dyestuff. This is filtered off, washed with water and dried.

1.1 parts of the dye free base thus obtained and 0.23 parts of magnesium oxide are suspended in 25 parts of chlorobenzene. 0.54 parts of dimethyl sulphate are added, and the mixture is heated at 130° for 30 minutes. After cooling, 1.4 parts of a dyestuff of formula I wherein A is an o-nitrophenyl radical, R is $$-C_3H_6-\overset{+}{M}(CH_3)_3CH_3SO_4^-$$

and $R^1$ is a hydrogen atom are precipitated. The dyestuff is filtered off and dried.

When applied to polyacrylonitrile from neutral or weakly acidic dyebaths, a mid-yellow shade with excellent wet and light fastness properties is obtained.

EXAMPLE 78

By replacing the 1.1 parts of the dye base employed in Example 70 by 1.35 parts of the dye base prepared from the dyestuff described in Example 11, a yellow dyestuff somewhat redder in shade than that described in Example 23 is obtained.

EXAMPLE 79

By replacing the 0.53 parts of dimethylsulphate used in Example 70 by a corresponding amount of benzyl chloride, a dyestuff of the formula I wherein A is an o-nitrophenyl radical, R is $$-C_3H_6-\overset{+}{N}(CH_3)_2\cdot CH_2Ph\ Cl^-$$

and $R^1$ is hydrogen is obtained.

When applied to polyacrylonitrile from a neutral or weakly acidic dyebath, a mid-yellow shade with good wet and light fastness properties is obtained.

Other dyestuffs obtained by alkylating disperse azo-homophthalimide dyes are given below ($R^1$ is a hydrogen atom in each case):

| Example | A | R | Alkylating agent | Shade |
|---|---|---|---|---|
| 80 | o-Nitrophenyl | —C₃H₆—N(CH₃)₂ | Propyl bromide | Yellow. |
| 81 | do | —C₃H₆—N(CH₃)₂ | Ethylenechlorohydrin | Do. |
| 82 | do | —C₃H₆—N(CH₃)₂ | Methyl p-toluenesulphonate | Do. |
| 83 | 2-nitro-4-methylaniline | —C₃H₆—N(C₂H₅)₂ | β-Chloropropionitrile | Do. |
| 84 | do | —C₃H₆—N(C₂H₅)₂ | Dimethylsulphate | Do. |
| 85 | 4-dimethylaminoethylaminosulphonyl | Ethyl | do | Greenish-yellow. |
| 86 | 2-nitro-4-dimethylaminoethylaminosulphonyl | do | do | Yellow. |

We claim:

1. A water soluble azo dyestuff free from sulphonic acid or from carboxylic acid groups and having the formula

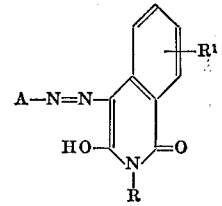

wherein A is ortho-nitrophenyl or orthonitrophenyl substituted wtih a member of the group consisting of nitro, chlorine, bromine, methyl, methoxy, acetyl, cyano, ethyl sulphonyl and trifluoromethyl, $R^1$ is hydrogen, nitro, hydroxy, methoxy, amino or acetamido and R is a protonated group having the formula $$-CH_2CH_2CH_2-\overset{+}{N}H(CH_3)_2$$

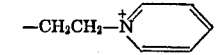

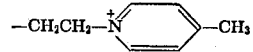

or $$-CH_2CH_2CH_2-\overset{+}{N}(CH_3)_2,$$

each of the said groups R being in association with an anion.

2. A water-soluble azo dyestuff as claimed in claim 1 wherein A is ortho nitro phenyl.

References Cited
UNITED STATES PATENTS

| | | | |
|---|---|---|---|
| 2,965,631 | 12/1960 | Sartori | 260—155 |
| 1,893,646 | 1/1933 | Holzach et al. | 260—155 X |
| 2,529,924 | 11/1950 | Dickey | 260—155 |
| 2,883,374 | 4/1959 | Enders | 260—146 R |
| 3,117,959 | 1/1964 | Dehnert | 260—155 |
| 1,087,427 | 2/1914 | Blank et al. | 260—156 |
| 2,099,525 | 11/1937 | Krzikalla et al. | 260—156 X |
| 3,518,247 | 6/1970 | Altermatt et al. | 260—156 |
| 3,538,074 | 11/1970 | Hegar | 260—156 |

FLOYD D. HIGEL, Primary Examiner

U.S. Cl. X.R.

260—286 Q, 289 QP, 294.8 R, 296 R, 306.7, 301.7, 562 R, 569, 567.6 M